US011308583B2

(12) United States Patent
Bakar et al.

(10) Patent No.: US 11,308,583 B2
(45) Date of Patent: *Apr. 19, 2022

(54) SYSTEMS, METHODS, AND MEDIA FOR ADJUSTING ONE OR MORE IMAGES DISPLAYED TO A VIEWER

(71) Applicant: Google LLC, Mountain View, CA (US)

(72) Inventors: Majd Bakar, San Jose, CA (US); David Deephanphongs, San Francisco, CA (US)

(73) Assignee: Google LLC, Mountain View, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/745,879

(22) Filed: Jan. 17, 2020

(65) Prior Publication Data

US 2020/0151853 A1  May 14, 2020

Related U.S. Application Data

(63) Continuation of application No. 16/025,328, filed on Jul. 2, 2018, now Pat. No. 10,540,753, which is a continuation of application No. 15/625,197, filed on Jun. 16, 2017, now Pat. No. 10,013,738, which is a continuation of application No. 14/470,064, filed on Aug. 27, 2014, now Pat. No. 9,704,220, which is a continuation-in-part of application No. 13/408,742, filed on Feb. 29, 2012, now abandoned.

(51) Int. Cl.
*G06T 3/60* (2006.01)
*G09G 3/20* (2006.01)

(52) U.S. Cl.
CPC ............ *G06T 3/606* (2013.01); *G09G 3/20* (2013.01); *G09G 2340/0492* (2013.01); *G09G 2354/00* (2013.01)

(58) Field of Classification Search
CPC ............ G06T 3/606; G09G 2340/0492; G09G 2354/00
See application file for complete search history.

(56) References Cited

U.S. PATENT DOCUMENTS

| 6,931,596 | B2 | 8/2005 | Gutta et al. |
| 6,968,094 | B1 * | 11/2005 | Gallagher .............. G06K 9/209 348/E5.046 |
| 8,212,662 | B2 | 7/2012 | Sasaki et al. |
| 2004/0157647 | A1 | 8/2004 | Takahashi |

(Continued)

OTHER PUBLICATIONS

Notice of Allowance dated Mar. 2, 2018 in U.S. Appl. No. 15/625,197.

(Continued)

*Primary Examiner* — Ariel A Balaoing
(74) *Attorney, Agent, or Firm* — Byrne Poh LLP

(57) ABSTRACT

Systems, methods, and media for adjusting one or more images displayed to a viewer are provided. In some implementations, the system comprises: at least one processing circuit configured to: detect an orientation of a viewer based on at least two points associated with the viewer; determine, based on the orientation, a rotational position of a first image to be displayed on a display; and generate a display image for display on the display, wherein the display image includes at least a portion of the first image rotated based on the rotational position.

17 Claims, 5 Drawing Sheets

(56) References Cited

U.S. PATENT DOCUMENTS

| | | | |
|---|---|---|---|
| 2004/0201595 A1* | 10/2004 | Manchester | G06F 1/1684 345/649 |
| 2007/0291035 A1* | 12/2007 | Vesely | G09B 9/00 345/427 |
| 2008/0100825 A1 | 5/2008 | Zalewski | |
| 2008/0111833 A1 | 5/2008 | Thorn et al. | |
| 2008/0266326 A1* | 10/2008 | Porwal | G06F 3/012 345/659 |
| 2010/0107184 A1* | 4/2010 | Shintani | H04N 21/4436 725/10 |
| 2010/0156781 A1 | 6/2010 | Fahn | |
| 2010/0156907 A1 | 6/2010 | VanderSpek et al. | |
| 2011/0001762 A1* | 1/2011 | Li | G06K 9/3208 345/649 |
| 2011/0050729 A1* | 3/2011 | Li | G06F 3/013 345/649 |
| 2011/0102462 A1 | 5/2011 | Birnbaum | |
| 2012/0062471 A1 | 3/2012 | Poulidis et al. | |
| 2012/0105473 A1* | 5/2012 | Bar-Zeev | G06T 7/70 345/633 |
| 2013/0038520 A1 | 2/2013 | Osman | |
| 2013/0051701 A1* | 2/2013 | Bloomfield | G06T 3/60 382/293 |
| 2013/0135350 A1* | 5/2013 | Santos-Gomez | G06F 3/04886 345/649 |
| 2013/0141464 A1* | 6/2013 | Hunt | G06F 3/0346 345/659 |
| 2015/0324014 A1* | 11/2015 | Liao | G06F 3/0346 345/156 |
| 2016/0274622 A1* | 9/2016 | Braun | G06F 1/1626 |

OTHER PUBLICATIONS

Notice of Allowance dated Mar. 10, 2017 in U.S. Appl. No. 14/470,064.
Notice of Allowance dated Sep. 6, 2019 in U.S. Appl. No. 16/025,328.
Office Action dated Feb. 27, 2014 in U.S. Appl. No. 13/408,742.
Office Action dated Mar. 31, 2016 in U.S. Appl. No. 14/470,064.
Office Action dated Apr. 29, 2019 in U.S. Appl. No. 16/025,328.
Office Action dated May 18, 2016 in U.S. Appl. No. 14/470,064.
Office Action dated Oct. 23, 2015 in U.S. Appl. No. 14/470,064.
Office Action dated Oct. 28, 2013 in U.S. Appl. No. 13/408,742.
Office Action dated Nov. 15, 2017 in U.S. Appl. No. 15/625,197.
Office Action dated Nov. 23, 2016 in U.S. Appl. No. 14/470,064.
Office Action dated Nov. 27, 2018 in U.S. Appl. No. 16/025,328.

* cited by examiner

SYSTEMS, METHODS, AND MEDIA FOR ADJUSTING ONE OR MORE IMAGES DISPLAYED TO A VIEWER

CROSS-REFERENCE TO RELATED APPLICATIONS

This application is a continuation of U.S. patent application Ser. No. 16/025,328, filed Jul. 2, 2018, which is a continuation of U.S. patent application Ser. No. 15/625,197, filed Jun. 16, 2017, which is a continuation of U.S. patent application Ser. No. 14/470,064, filed Aug. 27, 2014, which is a continuation-in-part of U.S. patent application Ser. No. 13/408,742, filed Feb. 29, 2012, each of which is hereby incorporated by reference herein in its entirety.

BACKGROUND

The present disclosure relates generally to the field of displays. More specifically, the present disclosure relates to adjusting a display based on an orientation of a viewer.

Televisions and other viewing screens are usually configured with the video displayed on the screen horizontally in a way that is most suited for an upright (vertical) head display. While this display mode leverages the number of pixels available to the display, and is what television viewers are accustomed to, it is not the most suitable for when viewers tilt their head (to the left or right, or to the back) or are not sitting upright (e.g., are laying on their side or are in a reclined position). Viewers might be slouching on the coach or when sitting in a bed might rest their head on a pillow, thus making the image display not optimal for viewing.

SUMMARY

Systems, methods, and media for adjusting one or more images displayed to a viewer are provided. In accordance with some implementations of the disclosed subject matter, a system for adjusting one or more images displayed to a viewer is provided, the system comprising: at least one processing circuit configured to: detect an orientation of a viewer based on at least two points associated with the viewer; determine, based on the orientation, a rotational position of a first image to be displayed on a display; and generate a display image for display on the display, wherein the display image includes at least a portion of the first image rotated based on the rotational position.

In accordance with some implementations of the disclosed subject matter, a method for adjusting one or more images displayed to a viewer is provided, the method comprising: detecting, using a hardware processor, an orientation of a viewer based on at least two points associated with the viewer; determining, based on the orientation, a rotational position of a first image to be displayed on a display; and generating a display image for display on the display, wherein the display image includes at least a portion of the first image rotated based on the rotational position.

In accordance with some implementations of the disclosed subject matter, non-transitory computer-readable media containing computer executable instructions that, when executed by a processor, cause the processor to perform a method for adjusting video displayed to a viewer, the method comprising: detecting an orientation of a viewer based on at least two points associated with the viewer; determining, based on the orientation, a rotational position of a video image to be displayed on a display; and generating a display image for display on the display, wherein the display image includes at least a portion of the video image rotated based on the rotational position.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION OF THE DRAWINGS

Referring generally to the figures, systems and methods for adjusting images to display for a viewer are shown and described. The disclosure relates to a system that determines the orientation of a viewer, such as head position or the eye axis of a viewer. Based on the head position and/or eye axis, the system adjusts an image on a display (e.g., a television or other monitor) to align with respect to the head position and/or eye axis. In one implementation, the system adjusts the image without mechanically moving the television or monitor housing, though the housing may be also adjusted in alternative implementations. The system keeps the image optimal for the position and/or orientation of the viewer's head rather than for a typical horizontal orientation. In one implementation, the location and/or orientation of the eyes of the viewer is determined and the image display is adjusted based on the location and/or orientation of the eyes. Additionally, other data may be inferred from the head position and/or eye axis that can help determine a state or mindset of the viewer, and additional viewing parameters (e.g., image display settings such as brightness and contrast; sound settings; auto off; etc.) may be adjusted accordingly.

The disclosure further relates to the display of supplemental data on the display, which may supplement, for example, a video program, web page, or other content being displayed. The supplemental data may be displayed in the space on the display that is no longer occupied by the image after the adjusted image is displayed. For example, as an image is rotated 90 degrees, the aspect ratio of the image may be maintained, thereby leaving a portion of the screen beside the image that is blank. This portion may be filled with supplemental data, such as a program guide, controls for the content being played (e.g., stop, pause, volume, etc.), web content related to the content being played (e.g., blogs, wikis, messaging such as tweets, etc.), or other supplemental content.

Figure 1:
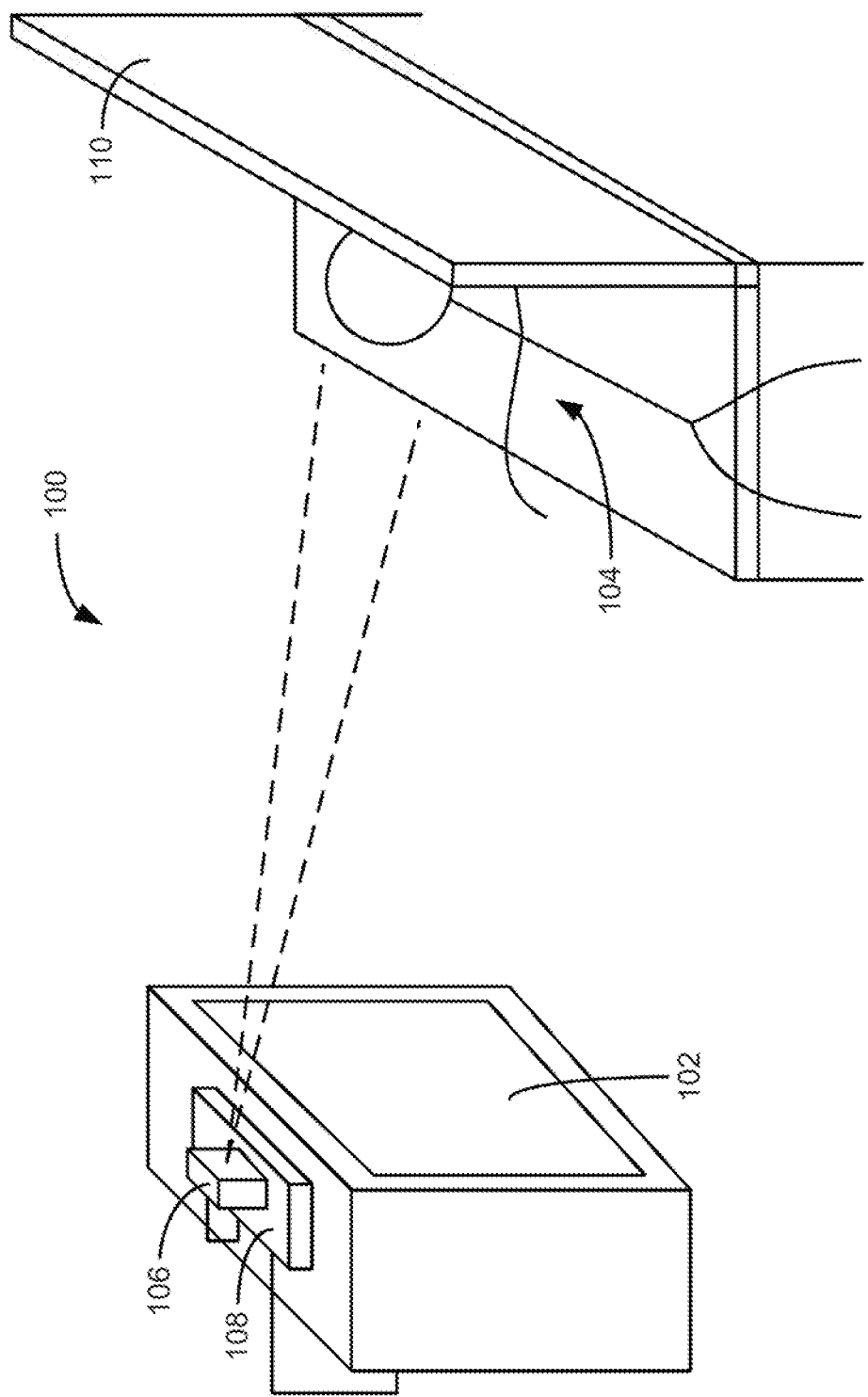
FIG. 1 is an environment view of a display and viewer in accordance with a described implementation.

Referring now to FIG. 1, an environment 100 in which the systems and methods of the present disclosure may be applied is shown. Environment 100 is provided as an example of a display and viewer configuration in, for example, a room; it should be understood that environment 100 including a display and viewer may be implemented in any type of setting without departing from the scope of the present disclosure.

Environment 100 is shown to include a display device 102 and a viewer 104 watching display 102. Display 102 is shown as part of a television in the implementation shown in FIG. 1. According to other implementations, display 102 may be a display for any type of electronic device (e.g., television, personal computer (PC), laptop, etc.) or other electronic source (e.g., video game console, etc.). Display 102 is configured to provide a display for viewer 104.

A viewer orientation detection device 106 is shown coupled to a television set-top box 108. Viewer orientation detection device 106 may be any device configured to determine the orientation (e.g., a head position or eye axis) of a viewer of display 102. In one implementation, viewer orientation detection device 106 comprises a camera. While the systems and methods of the present disclosure describe viewer orientation detection device 106 as a camera, it should be understood that in other implementations, viewer orientation detection device 106 may comprise any detection device configured to detect at least one of position and orientation of at least a portion of viewer 104, or may be any type of sensor configured to detect a location of viewer 104 or viewer 104 behavior. For example, according to another implementation, the viewer orientation detection device may be a laser-based detector or an infrared detector configured to detect at least one of position and orientation of at least a portion of a viewer. Additionally, according to another implementation, the viewer orientation detection device may be used in combination with a device worn by the viewer (e.g., a laser emitting apparatus) that can communicate with the viewer orientation detection device. Set-top box 108 receives data from viewer orientation detection device 106 for determining the orientation of viewer 104. Viewer orientation detection device 106 may further be coupled to display 102, a remote source, or any other device configured to apply rotational position adjustments to an image for display on display 102 according to various implementations.

In the implementation of FIG. 1, since display 102 is a television display, a television set-top box 108 is shown and is configured to provide the television with content to display. In other implementations, display 102 may be a display for another electronic device (e.g., monitor) and set-top box 108 may not be included in environment 100.

Viewer 104 is shown watching display 102 while laying on a seat or couch 110. Viewer 104 may be watching display 102 while his or her head is tilted at an angle from display 102. This may be the result of laying down on a seat or sofa, as a result of sitting or standing, or a result of any other type of motion or viewing position. Display 102 is traditionally configured to provide a display for viewer 104 assuming the viewer is in an upright position (e.g., eye axis generally parallel to a horizontal dimension of the monitor). As viewer 104 watches the content on display 102 when his or her head is tilted at an angle, the display is no longer optimal for viewer 104.

Figure 2B:
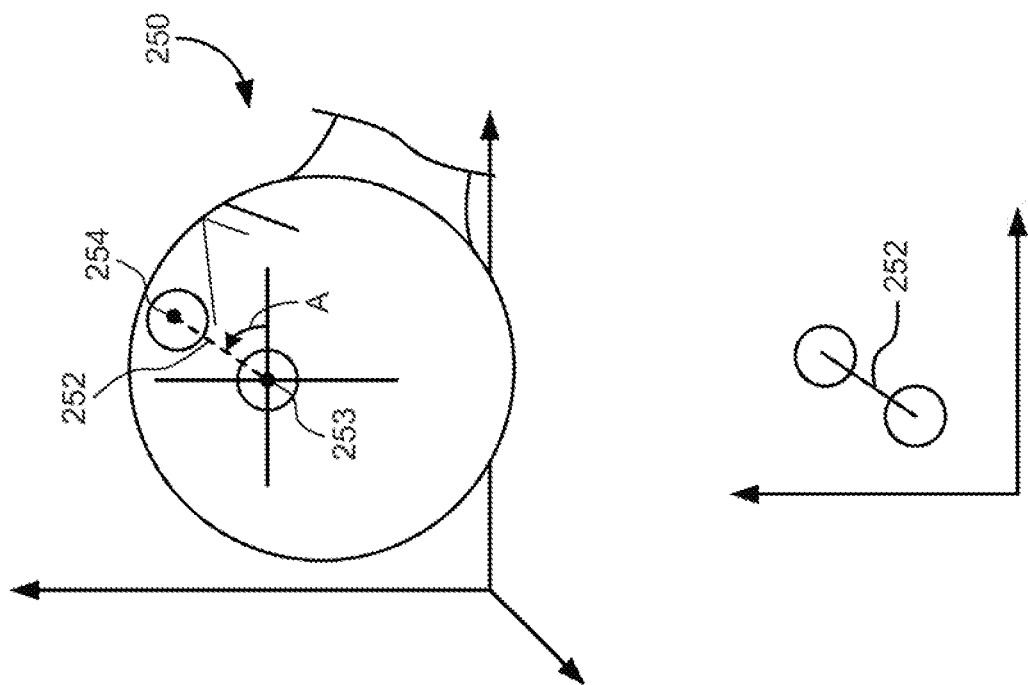
FIGS. 2A and 2B are illustrations of a viewer's head and a method of determining orientation of the viewer's head in accordance with a described implementation.
Figure 2A:
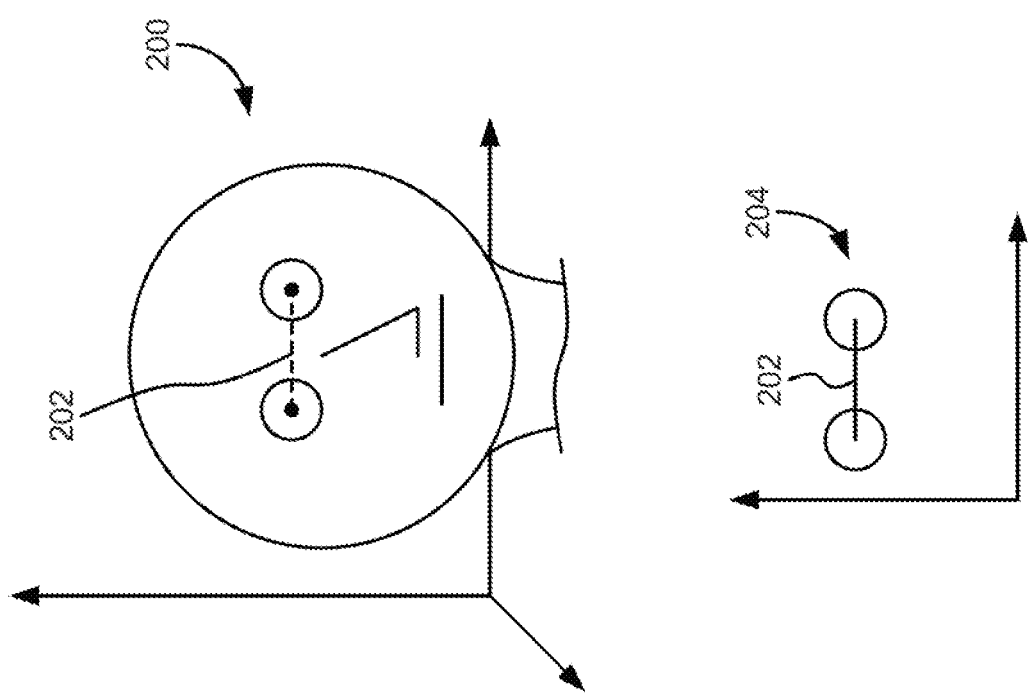

Referring now to FIGS. 2A and 2B, viewer orientation detection device 106 can determine a position of the head of viewer 104 and the eye axis of viewer 104. Determining the position of the head of viewer 104 may include determining the location of the head. For example, the head location may be represented as coordinates in a three-dimensional (3D) space (e.g., (x, y, z) coordinates, polar coordinates, cylindrical coordinates, etc.) or two-dimensional (2D) space (e.g., (x, y) coordinates), may be represented as an absolute distance from the display 102, may be represented as a distance and angular distance from the monitor (e.g., an absolute distance from the display 102 and an angle between the viewer 104 and display 102), etc. Further, the orientation of the head may be determined. The orientation may include determining if the head is turned, if the head is directly looking at the monitor or not, or otherwise.

When the position of the head is determined, the eye axis of viewer 104 may be determined. The eyes of the head may be located and the eye axis may be defined as the axis line that connects the locations of the two eyes in the 2D or 3D space (e.g., in (x, y) or (x, y, z) coordinates). Determining the eye axis of viewer 104 may include any number of eye detection techniques (such as, e.g., those used in conjunction with facial recognition techniques or software). For example, light may be reflected from the eyes of viewer 104 and sensed by a camera of viewer orientation detection device 106, and the information from the changes in reflection are used to analyze the eye axis and other eye features. It should be understood the eye detection methods may vary according to various implementations.

As one example, in FIG. 2A, viewer 200 may be viewing display 102 in an upright horizontal position. The eye location 204 and eye axis 202 of the viewer may be determined. In FIG. 2A, eye axis 202 is shown as a horizontal line, indicating to monitor 102 that the viewer is in an upright horizontal position and that no display adjustment is needed. Eye axis 202 is a line with the same coordinate values in two directions (e.g., the y- and z-coordinates for both eyes are the same, indicating both eyes are at the same depth and relative height from display 102), while the x-coordinates of the eyes are different (which is representative of the spacing between the eyes).

As another example, in FIG. 2B, viewer 250 is shown at an angle (e.g., angle A) that is offset from the horizontal axis (e.g., x-axis) relative to display 102. Viewer 250 may be laying down or otherwise tilting his or her head to watch display 102. The head position may be determined by a processing circuit within viewer orientation detection device 106 or set-top box 108, including the orientation of the head. In FIG. 2B, the head of viewer 250 is pointing towards a location up and to the left of a "center" of the display screen, but the viewer may be looking forward to watch display 102.

The eye locations 253, 254 and/or eye axis 252 of viewer 250 may be determined. Since the head of viewer 250 is at an angle that is offset from the horizontal axis relative to display 102, eye axis 252 may be a line, each point of which has different coordinate values in three directions (on the (x, y, z) axis), indicating the distance of each eye to display 102 is different. Further, one eye 254 may be "higher" in a y-axis dimension than the other eye 253 as shown, further changing the perspective of the view of viewer 250. Using eye axis 252, a rotational position of an image on display 102 may be determined that correlates with eye axis 252. The adjustment of the image is described in greater detail in FIGS. 4-8. One or more of the coordinate values of each eye may be disregarded; for example, the fact that eye 254 is further from monitor than eye 253 may be immaterial to a determination that eye axis 252 is at an angle A relative to display 102. The system may be configured to determine the angle A and adjust the image orientation on display 102 based on angle A.

In one implementation, portions of the head of the viewer may be used to assist in the head position and/or eye axis determinations. For example, a location of a forehead or chin of the viewer may be determined, and the head position and eye axis locations may be determined based on the location of the forehead or chin. The forehead or chin may further be used to determine if the viewer is leaning forwards or backwards. For example, a forehead farther away from the monitor than the chin indicates that the viewer is leaning backwards.

Figure 3A:
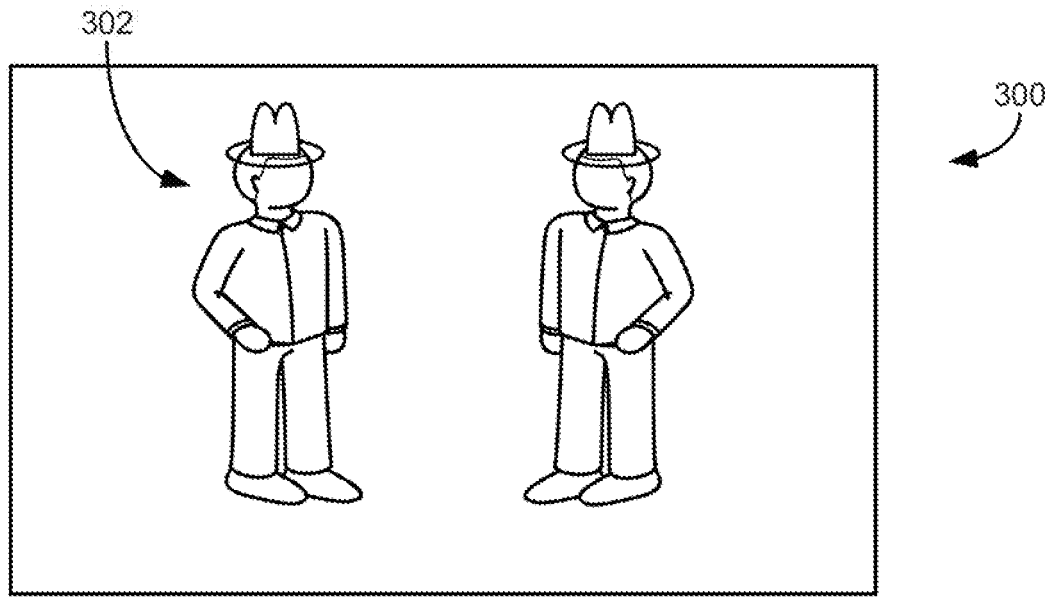
FIGS. 3A and 3B are illustrations of a rotated image on a display in accordance with a described implementation.
Figure 3B:
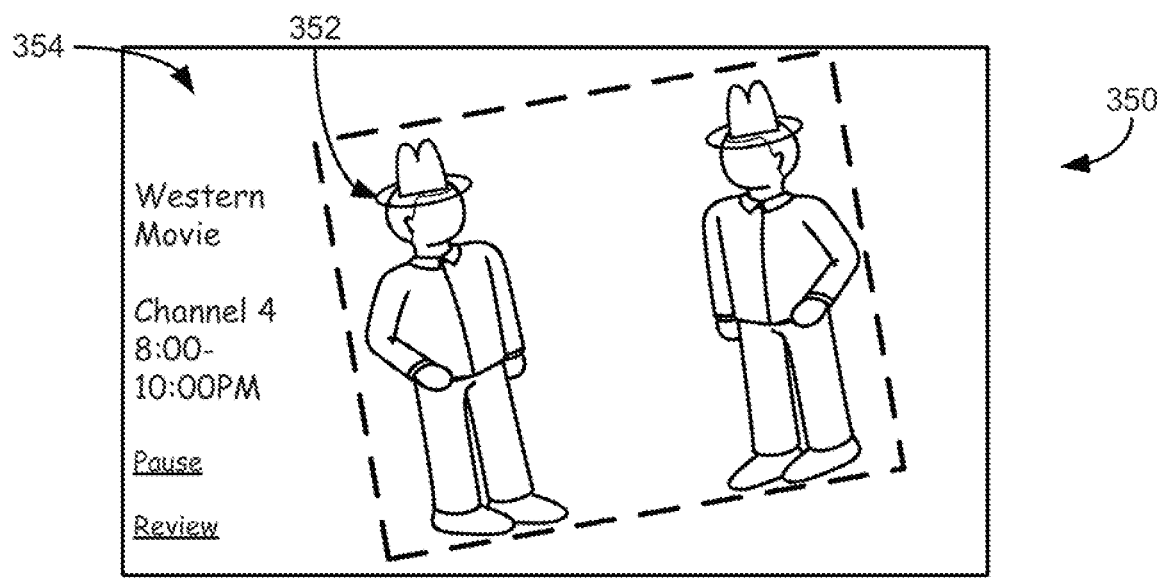

Referring now to FIGS. 3A and 3B, the result of a rotational position adjustment of an image on a monitor is shown in greater detail. In FIG. 3A, an image 302 is shown on display 300 unadjusted. When a viewer is watching display 300 in an upright position (e.g., viewer 200), image 302 is unadjusted and there is no unused space on display 300. In other implementations, image 352 may be tilted and rotated, just rotated, or any combination of tilted, rotated, stretched, or any other type of modification. For example, image 352 may only be rotated if the viewer is to one side of the display, image 352 may be stretched as well if the viewer's head is not pointing at the display, image 352 may be tilted as well if the viewer's head is above or below the display, etc.

In FIG. 3B, image 352 is shown tilted (e.g., rotated, adjusted, etc.) and stretched as a result of a head position and eye axis of a viewer such as viewer 250. Image 352 is adjusted such that the plane of image 352 is compatible with the eye axis of the viewer (e.g., the rotational position of image 352 is roughly parallel with the eye axis).

In FIG. 3B, image 352 is shown with a border to define the area of display 350 in which the image is displayed; the border may or may not be visible to the viewer according to various implementations. When image 352 is rotated, some of the display of display 350 becomes unused. According to one implementation, the unused space may be used to display supplemental data 354. Supplemental data 354 may include the name of the program and/or program information (e.g., air times, channel information, etc.), controls for the display (e.g., the viewer can select, via a television remote, to pause or stop the display), and/or web content related to the display (e.g., a link that a viewer can select to access reviews, fan sites, blogs, posts, or other web content), etc.

Figure 4:
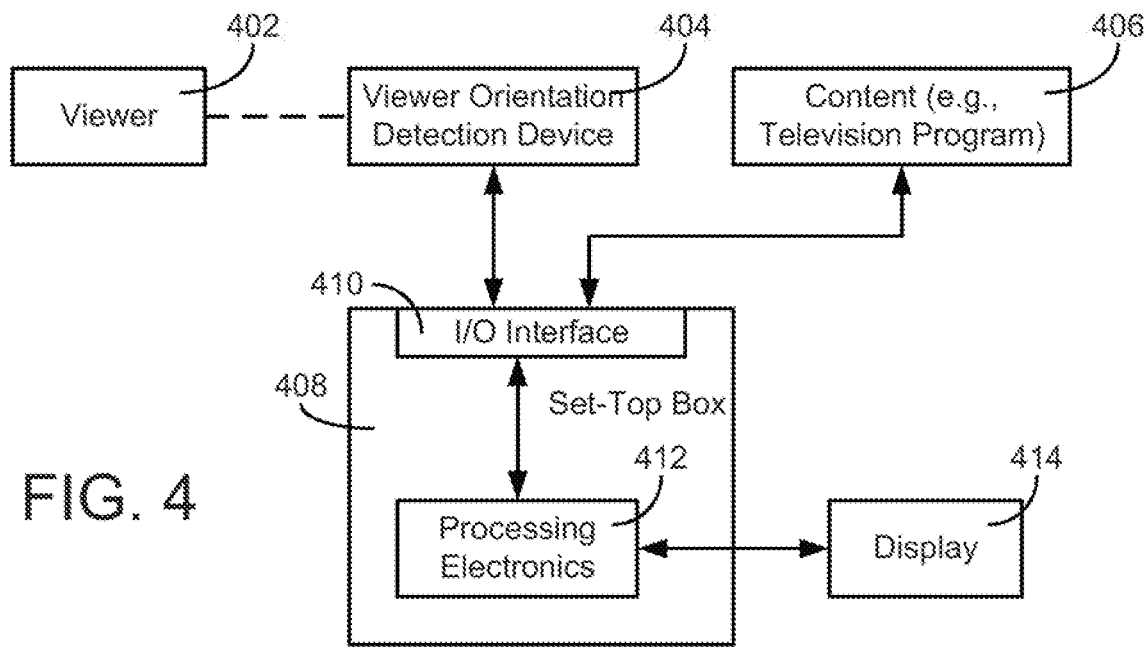
FIG. 4 is a block diagram of a display system configured to adjust an image to display to a viewer in accordance with a described implementation.

Referring now to FIG. 4, a block diagram of a display system is shown in accordance with a described implementation. The display system includes a viewer 402, a viewer orientation detection device 404 configured to detect the orientation of viewer 402, content 406 (e.g., a television program) from a content source (e.g., a remote internet server, a cable TV source, a satellite TV source, a DVD player, etc.), a television set-top box 408, and a display 414 configured to display content 406. Viewer 402 may be the viewer as generally described in FIGS. 1-3. Display 414 may be a display for a television in the implementation of FIG. 4, and set-top box 408 is configured to be connected to the television and to provide display 414 with adjusted content 406. It should be understood that in other implementations, display 414 may not be a television display and the display system may not include a set-top box 408. In such an implementation, the components of set-top box 408 may be a part of display 414 or part of another device.

Viewer orientation detection device 404 may be any device configured to capture viewer 402 properties such as the head position or eye axis of viewer 402. In one implementation, viewer orientation detection device 404 comprises a camera. The camera is configured to capture images of viewer 402 and to provide the images to the processing electronics 412 of set-top box 408 for processing. In one implementation, viewer orientation detection device 404 may be a stationary camera with a fixed location, and may capture viewer 402 properties when the viewer is in range of the camera. In another implementation, viewer orientation detection device 404 may be a camera configured to pan, tilt, or zoom in or out in order to capture an image of viewer 402. In some implementations, viewer orientation detection device 404 may determine an orientation and/or position of viewer 402 as the viewer moves about environment 100, for example, by moving (e.g., panning, tilting, zooming in or out, and/or any other suitable type of movement) in order to capture an image of the viewer.

In some implementations, any images captured by viewer orientation detection device 404 may be only used to determine the properties described herein and used for no other purpose. These images may be deleted from all components of FIGS. 4 and 5 shortly after the properties are determined in some implementations.

Content 406 may be any content to be displayed on display 414. For example, display 414 may be part of a television and content 406 may include a television program from any source (e.g., cable television, satellite television), a movie being played via a DVD player, a video game, internet content, etc. It should be understood that the type of content 406 displayed on display 414 may be varied without departing from the scope of the present disclosure.

Television set-top box 408 is configured to receive content 406 to display on display 414 via input/output (I/O) interface 410. Set-top box 408 is further configured to receive images of viewer 402 and/or other data from viewer orientation detection device 404 via I/O interface 410. I/O interface 410 is configured to facilitate communications, either via a wired connection or wirelessly, with viewer orientation detection device 404 and the providers of content 406.

Figure 5:
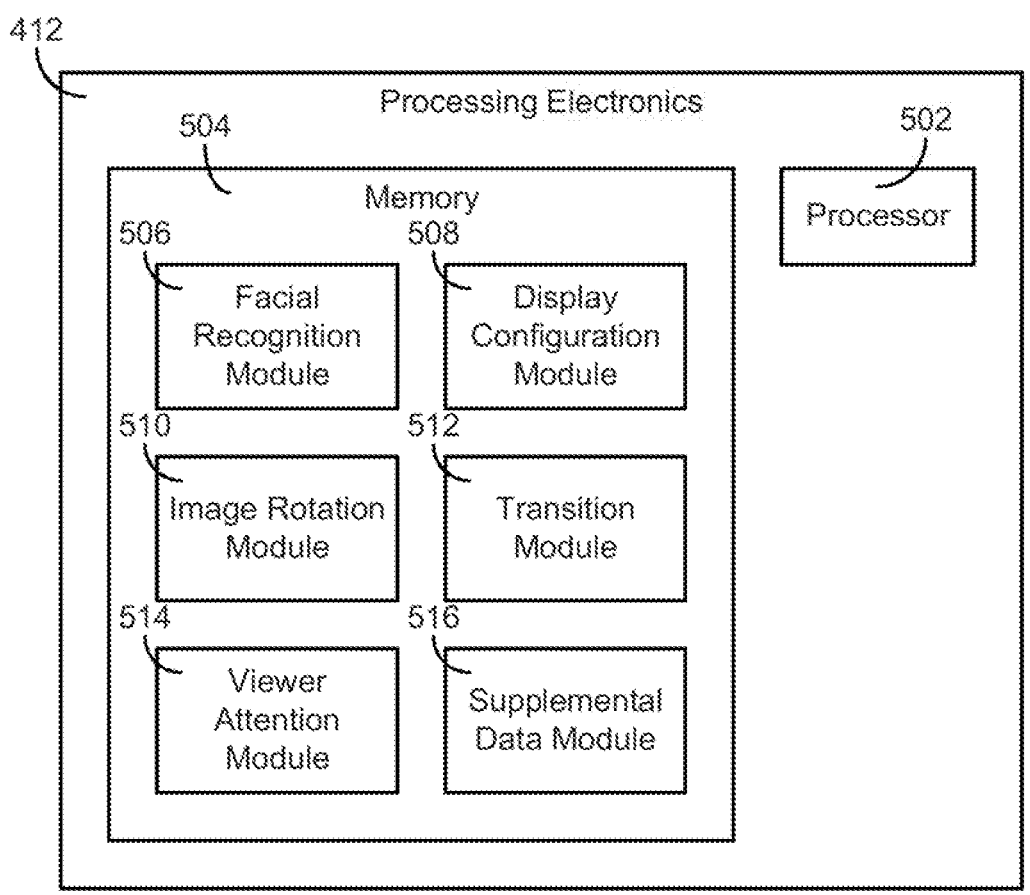
FIG. 5 is a more detailed block diagram of the processing electronics of the display system of FIG. 4 in accordance with a described implementation.

Set-top box 408 receives images and other data from viewer orientation detection device 404 and provides the images and data to processing electronics 412 (shown in greater detail in FIG. 5). Processing electronics 412 are configured to use the images and other data to determine an orientation of viewer 402. Using the orientation of viewer 402 and the received content 406, processing electronics 412 are configured to determine a rotational position of images of the content. Processing electronics 412 provides display 414 with the rotational position to allow display 414 to optimally display content 406 on display 414.

Referring now to FIG. 5, processing electronics 412 is shown in greater detail. Processing electronics 412 is shown to include a processor 502 and memory 504. Processor 502 may be implemented as one or more general purpose processors, application specific integrated circuits (ASIC), field programmable gate arrays (FPGAs), a group of processing components, or other suitable electronic processing components in one or more housings, local and/or remote from display 102. Memory 504 may comprise one or more devices (e.g., RAM, ROM, Flash memory, hard disk storage, etc.) for storing data and/or computer code for completing and/or facilitating the various processes described herein.

Memory 504 may be or include non-transient volatile memory or non-volatile memory. Memory 504 may include data base components, object code components, script components, or any other type of information structure for supporting the various activities and information structures described herein. Memory 504 may be communicably connected to processor 502 and includes computer code or instructions for executing one or more processes described herein.

Memory 504 may include various modules for completing the methods described herein. It should be understood that memory 504 may include more or less modules, and that some of the activity described as occurring within memory 504 and processing electronics 502 may be completed by modules located remotely from processing electronics 412. For example, some or all of the viewer orientation information may be determined by viewer orientation detection device 404 instead of processing electronics 502.

Memory 504 includes a viewer detection module shown in FIG. 5 as facial recognition module 506. Facial recognition module 506 is configured to receive images and data from viewer orientation detection device 404 and to identify viewer 402 in the images. Facial recognition module 506 may further be configured to determine the orientation of viewer 402 (e.g., the head position and/or eye axis of viewer 402). Facial recognition module 506 may include logic for determining the head position and eye axis as generally described in FIGS. 2A and B. According to other implementations, the process of identifying viewer 402 and determining the orientation of viewer 402 may occur in separate modules.

Memory 504 may further include display configuration module 508. Display configuration module 508 is configured to use the orientation of viewer 402 (determined by facial recognition module 506 or another module) to determine a display configuration for the content to be displayed. The display configuration includes a rotational position of the images to be displayed on the display. For example, based on an eye axis, display configuration module 508 is configured to determine a rotational position of the image to match the eye axis.

Display configuration module 508 may include logic for determining rotational positions for an image or for predetermined rotational positions. For example, based on the eye axis of viewer 402, a rotational position for an image is determined. In one implementation, the offset of the eye axis is used to determine the rotational position. For example, if a viewer is viewing display 414 at a 20 degree angle to the left of a vertical axis of display 414, the image may be rotated to the left at a 20 degree angle to compensate. The rotational position of the image may include rotating the image left or right based on if viewer 402 is to the left of center or right of center of display 414. The rotational position of the image may include rotating the image up or down based on if the eye axis of viewer 402 is above the center or below the center of display 414. These viewer 402 positions are shown in greater detail in FIGS. 2A and 2B.

Further, the rotational position of the image may include rotating the image based on a tilt of the head of viewer 402. For example, the head may be tilted to one side or the other, or tilted backward or forward. If the head is tilted to one side, the image may be rotated to the side the head is pointing towards. If the head is tilted back, the image may be tilted forward. In one implementation, chin or forehead location information (or other location information for portions of the viewer 402's head) may be used to determine whether to tilt an image forward or backward.

In one implementation, instead of an exact calculation of a rotational position based on an eye axis, there may be a predetermined number of preset rotational positions. For example, an image to be displayed may be rotated at 15 degree increments based on the eye axis of viewer 402. If the eye axis is offset by, for example, 10 degrees, the image may be rotated by 15 degrees, but if the eye axis is offset by, for example, 5 degrees, the image may not be rotated at all. The increments by which the image is rotated may be 5 degrees, 15 degrees, 30 degrees, or any other increment. These increments may be used for rotating the image left, right, up, or down, which may allow for a finite number of possible rotational positions, according to one implementation.

In one implementation, display configuration module 508 may determine the zoom at which an image is shown. According to one implementation, when a rotational position of an image is changed, there may be unused space on display 414. Therefore, the image may then be scaled (e.g., zoomed in) such that a maximum amount of space in display 414 may be used.

In another implementation, the zoom may be based on viewer proximity. Viewer proximity information (e.g., distance to the display) may be provided to display configuration module 508 and used to determine how much to zoom in or out on the image shown in display 414. For example, if viewer 402 is close to the display, the image may be zoomed out on.

Display configuration module 508 may include any number of threshold values relating to rotational positions of an image. For example, the rotation of an image or other display properties may be restricted based on display settings or viewer settings. If a viewer is far away from display 414, there may be a limit to the zooming in on the image. If a viewer is too offset to display 414 (too far to one side of the display), there may be a limit to the amount of rotation of the image. Display configuration module 508 may otherwise crop the image in various ways, according to various implementations.

Memory 504 may further include image rotation module 510. Using the display configuration (determined by display configuration module 508), image rotation module 510 applies rotations, reflections, and tilts to the image. In other words, image rotation module 510 applies the rotational positions to the image for display. Image rotation module 510 receives the content 406 to display, applies the rotational positions to the content 406, and provides the adjusted content to display 414 for display. In various implementations, the activities of module 508 and 510 may be performed in the same module.

Memory 504 may further include transition module 512. Transition module 512 is configured to control a transition of the display from one configuration to a new configuration based on the new rotational position of the image. Instead of instantaneously changing the rotational position of an image on the display, it may be desired to slowly transition an image from the traditional horizontal display to another display. For example, if viewer 402 suddenly changes his or her orientation, it may be desirable not to immediately change display 414, since viewer 402 may further change his or her orientation. In such a case, there may be a built-in delay, filter, or hysteresis before changing the rotational position of the image on display 414. For example, transition module 512 may set a five-second delay before any rotational position adjustment is applied to an image. As other examples, a delay of less than about five seconds, less than about two seconds, less than about ten seconds, or any other length delay, may be applied.

Transition module 512 may further control the rotational position change of the image on display 414. For example, an orientation of viewer 402 may suggest that an image should be rotated 60 degrees to the left. However, it may not be desirable to suddenly change from a un-rotated image to an image rotated 60 degrees to the left. Therefore, in one implementation, a transition may be applied to the image such that it is continually rotated slowly into the final position of 60 degrees to the left. For example, the image may be rotated at a rate of about 5 degrees per second or less, about 15 degrees per second or less, etc. In another implementation, instead of a continuous rotation, the rotation may be performed in "stages". For example, the image may be rotated 5 degrees at a time, up to the final desired rotation of 60 degrees. As another example, the image may be rotated 10 degrees every second until the final desired rotation of 60 degrees is reached. Transition module 512 may be configured to determine a rotational position pattern to apply to the image given the information about the desired final rotational position of the image from modules 508, 510. Transition module 512 may provide the rotational position pattern to image rotation module 510, and image rotation module 510 may adjust the images accordingly.

Memory 504 further includes viewer attention module 514. Viewer attention module 514 receives the images and other data from viewer orientation detection device 404 and is configured to determine whether viewer 402 is watching the display. This determination may then be used to alter the display of images on display 414. As one example, if a viewer 402's eyes are closed, viewer attention module 514 may determine that the viewer 402's eyes are closed using the images and other data from viewer orientation detection device 404. Viewer attention module 514 may then determine a length of time the viewer 402's eyes are closed and may either turn off display 414, pause display 414, or take some other display-related action in response to the viewer not watching the display. As another example, when the viewer 402 begins viewing the monitor again, display 414 may be unpaused when viewer attention module 514 detects viewer 402 once again watching the monitor.

Memory 504 further includes supplemental data module 516. Supplemental data module 516 may receive or determine supplemental data that may be displayed on display 414. Supplemental data may include a program guide or program guide information (e.g., title of a television program, air times of the program, short description of the program, actors in the program, current channel of the television, etc.), controls for the display (e.g., a pause button or stop button that viewer 402 may select via remote control, a volume control, etc.), or web content related directly or indirectly to the image being displayed (e.g., a link to a website, a blog post, a tweet, a post or message on a social networking site or other site, or other content selectable by viewer 402 via remote control). Supplemental data may further include any other data not related to the image being displayed (e.g., time, weather, etc.).

Figure 6:
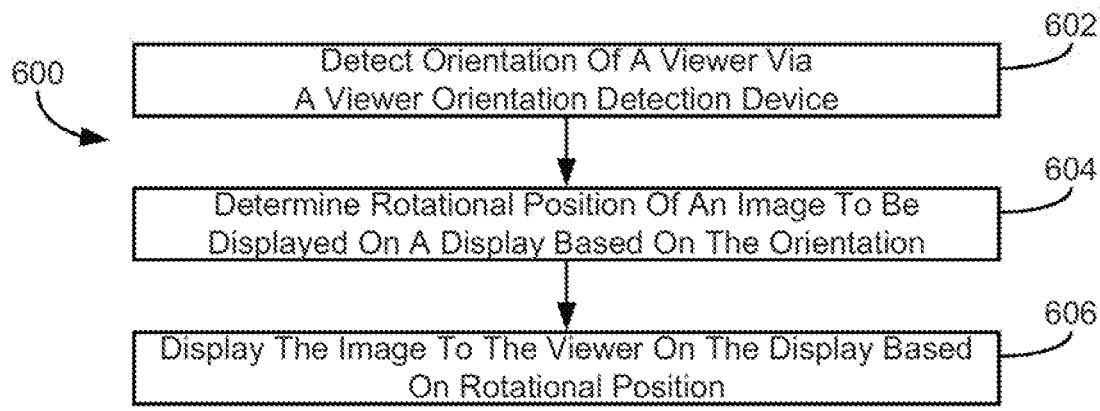
FIG. 6 is a flow diagram of a process for adjusting an image to display on a monitor using rotational position in accordance with a described implementation.
Figure 7:
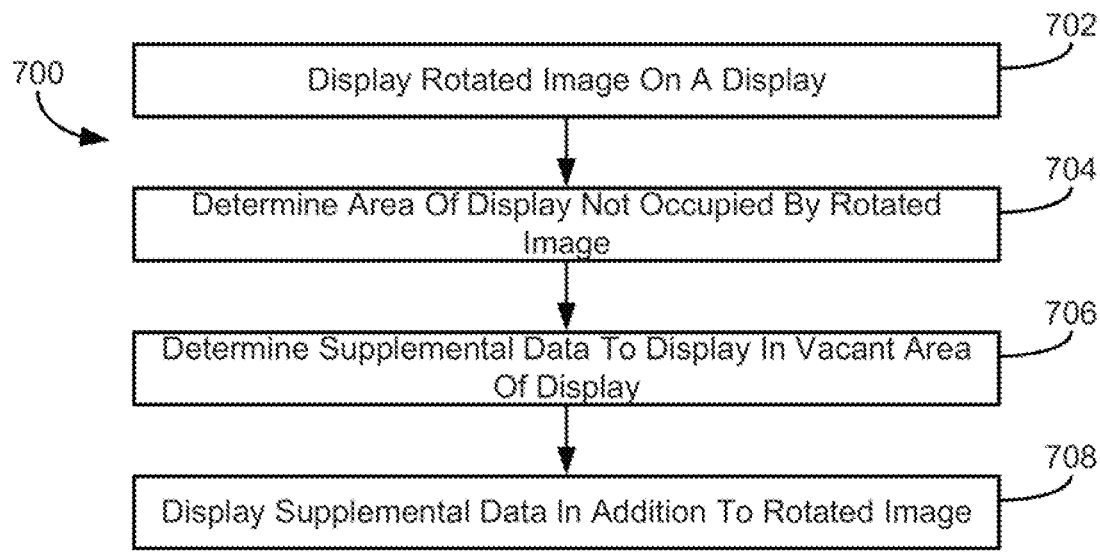
FIG. 7 is a flow diagram of a process for displaying an image and supplemental data on a monitor in accordance with a described implementation.
Figure 8:
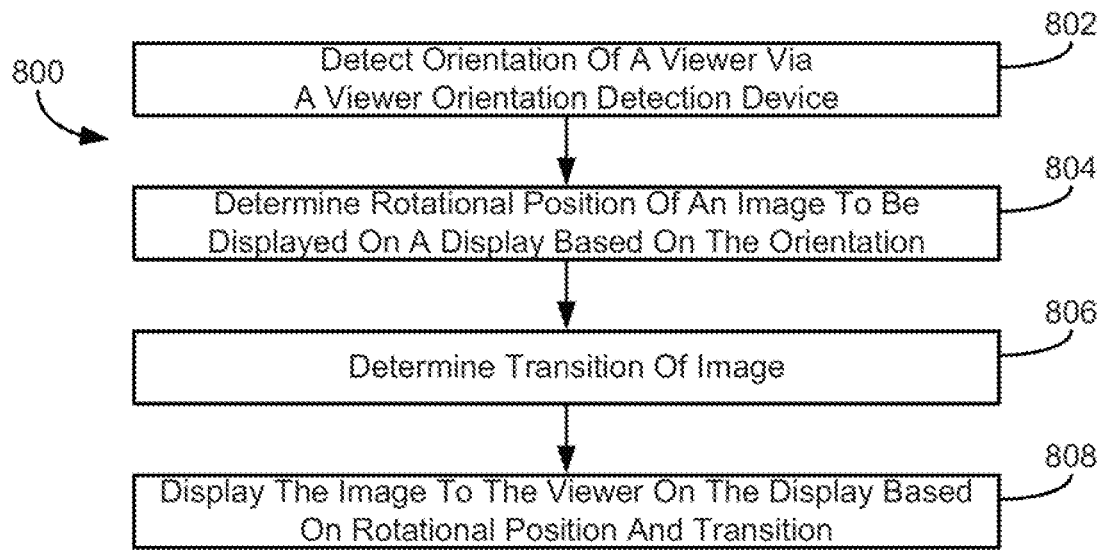
FIG. 8 is a flow diagram of a process for adjusting an image to display on a monitor using rotational position and transitions in accordance with a described implementation.

Referring generally to FIGS. 6-8, various processes that may be executed by the modules of processing electronics 412 are described. It should be understood that the various blocks of FIGS. 6-8 may be executed in any order or in any combination in accordance with any number of implementations.

Referring now to FIG. 6, a flow diagram is shown of a process 600 for adjusting an image to display on a monitor using rotational position in accordance with a described implementation. Process 600 includes detecting orientation of a viewer (block 602) of a display. A viewer orientation detection device may be used to capture images of the viewer, and a facial recognition module (e.g., facial recognition module 506 of FIG. 5) or another device may determine the orientation of the viewer as described in the present disclosure. The orientation of the viewer may include head position, eye axis information, or other data relating to a viewer location or position.

Process 600 further includes using the orientation of a viewer to determine a rotational position of a image to be displayed on a display to the viewer (block 604). The rotational position of the image may be determined such that the viewer may view the image optimally. A rotational position may be determined by, for example, the display configuration module 508 of FIG. 5. Process 600 further includes displaying the image to the viewer on the display based on the rotational position (block 606).

Referring now to FIG. 7, a flow diagram of a process 700 for displaying an image and supplemental data on a monitor is shown in accordance with a described implementation. Process 700 includes displaying a rotated image on a display (block 702). When the rotated image is displayed, there may be areas of the display that are unused. Process 700 includes determining an area of the display not occupied by the rotated image (block 704).

Process 700 further includes determining supplemental data to display in the vacant area of the display determined in block 704 (block 706). Supplemental data may include a program guide or program guide information (e.g., title of a television program, air times of the program, short description of the program, actors in the program, current channel of the television, etc.), controls for the display (e.g., a pause button or stop button that viewer 402 may select via remote control, a volume control, etc.), and/or web content related to the image being displayed (e.g., a link to a website, a blog post, a tweet, a post or message on a social networking site or other site, or other content selectable by viewer 402 via remote control). Supplemental data may be determined by, for example, supplemental data module 516 of FIG. 5. Supplemental data maybe viewer configurable (that is, the viewer chooses what supplemental data the viewer sees).

Process 700 includes displaying the supplemental data in addition to the rotated image (block 708). The activities of block 708 may include determining a display format for the supplemental data (e.g., font size, which portions of the vacant display to use, etc.).

Referring now to FIG. 8, a flow diagram of a process 800 for adjusting an image to display on a monitor using rotational position and transitions is shown, in accordance with a described implementation. Process 800 includes detecting orientation of a viewer via a viewer orientation detection device (block 802) and determining rotational position of an image to be displayed on a display based on the orientation (block 804). Process 800 further includes determining a transition of the image (block 806). Block 806 may include determining how to transition from the image from one position on the display to another. Transitions may include, for example, a sudden rotational position change of the image, a built-in delay configured to keep the image in a first position for a specified amount of time before transitioning the image, a gradual transition from one position of an image to another, etc. Block 806 may be executed via, for example, transition module 512 of FIG. 5. Process 800 further includes displaying the image to the viewer on the display based on the rotational position and the transitions (block 808).

In one implementation of the present disclosure, in addition to determining an orientation of a particular viewer, the systems and methods of the present disclosure may be used to identify one or more particular viewers whose orientations are to be determined. For example, if multiple people are viewing a monitor, logic for identifying a particular viewer whose orientation is to be determined may be included. For example, the orientation of a main viewer (e.g., the owner of the monitor, a viewer determined to be logged-in to a user account associated with the monitor and/or a set-top box, a viewer determined to be closest to a user device such as a mobile phone that is associated with the monitor, and/or any other suitable main viewer) may be determined, or the orientations of multiple viewers may be determined. The viewer orientation detection device may provide images and other data for multiple viewers, and a rotational position of an image on the display may be determined such that the display is optimal for just one viewer, or is optimal for all viewers, or for any combination of viewers. The process may include any number of viewer identification techniques to identify the particular viewer(s) whose orientations are to be determined.

It should be understood that while the processing electronics used to execute the systems and methods of the present disclosure is shown local to the monitor, the processing electronics may otherwise be located remotely from the monitor in other implementations.

In various implementations, the modules described herein may be used in other television or display-based systems. For example, viewer attention module 514 of FIG. 5 may be used in other display-based systems. In one implementation, viewer attention module 514 information may be used to change any aspect of the display (e.g., volume, brightness, contrast, etc.) for any type of content being displayed.

Configurations of Various Illustrative Implementations

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the viewer. A companion application to the smart television module may be operable on a mobile computing device to provide additional information about available programs to a viewer, to allow the viewer to control the smart television module, etc. In alternate implementations, the features may be implemented on a laptop computer or other personal computer, a smartphone, other mobile phone, handheld computer, a tablet PC, or other computing device.

In situations in which the systems described herein collect personal information about and/or images of viewers, or make use of personal information and/or images of viewers, the viewers may be provided with an opportunity to control whether programs or features collect viewer information (e.g., information about a viewer's social network, social actions or activities, profession, a viewer's preferences, or a viewer's current location) and/or images. In addition, certain data may be treated in one or more ways before it is stored or used, so that personal information and/or images are removed. For example, a viewer's identity may be treated so that no personally identifiable information can be determined for the viewer, or a viewer's geographic location may be generalized where location information is obtained (such as to a city, ZIP code, or state level), so that a particular location of a viewer cannot be determined. Thus, the viewer can have control over how information and/or images about the viewer are collected and used by a content server. As another example, images may be masked when captured so that the identity, facial expression, gender, and any other characteristics of the viewer other than position and/or orientation are not determined from the images. Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for adjusting one or more images displayed to viewers, the method comprising:
    determining an angle of rotation of first content to be displayed on a display based on an orientation of a viewer;
    determining a rotational limit for the angle of rotation of the first content; and
    causing second content to be presented on the display, wherein the second content includes at least a portion of the first content rotated by the angle of rotation and subject to the rotational limit.

2. The method of claim 1, wherein the method further comprises detecting the orientation of the viewer based on a device worn by the viewer.

3. The method of claim 1, wherein the method further comprises determining a position of the viewer, wherein the angle of rotation of the first content to be displayed is based on the position of the viewer.

4. The method of claim 1, the method further comprises determining a state of eyes of the viewer; wherein the angle of rotation of the first content to be displayed is based on the state of the eyes of the viewer.

5. The method of claim 1, wherein the method further comprises determining positions of eyes of the viewer, wherein the angle of rotation of the first content to be displayed is based on the positions of the eyes of the viewer.

6. The method of claim 1, wherein the method further comprises detecting a lean of a head of the viewer.

7. The method of claim 1, further comprising:
    detecting that the orientation of the viewer has changed from a first orientation to a second orientation;
    updating the presentation of the second content, wherein the second content includes at least a portion of the first content rotated based on the second orientation of the viewer after a predetermined amount of time has elapsed.

8. The method of claim 1, further comprising:
    detecting that the orientation of the viewer has changed from a first orientation to a second orientation;
    determining an updated angle of rotation of the first content to be displayed based on the second orientation of a viewer; and
    updating the presentation of the second content, wherein the second content is rotated includes at least a portion of the first content rotated at a rotational rate between the angle of rotation and the updated angle of rotation.

9. A system for adjusting one or more images displayed to viewers, the system comprising:
    a hardware processor that is configured to:
        determine an angle of rotation of first content to be displayed on a display based on an orientation of a viewer;

determine a rotational limit for the angle of rotation of the first content; and cause second content to be presented on the display, wherein the second content includes at least a portion of the first content rotated by the angle of rotation and subject to the rotational limit.

10. The system of claim 9, wherein the hardware processor is further configured to detect the orientation of the viewer based on a device worn by the viewer.

11. The system of claim 9, wherein the hardware processor is further configured to determine a position of the viewer, wherein the angle of rotation of the first content to be displayed is based on the position of the viewer.

12. The system of claim 9, wherein the hardware processor is further configured to determine a state of eyes of the viewer; wherein the angle of rotation of the first content to be displayed is based on the state of the eyes of the viewer.

13. The system of claim 9, wherein the hardware processor is further configured to determine positions of eyes of the viewer, wherein the angle of rotation of the first content to be displayed is based on the positions of the eyes of the viewer.

14. The system of claim 9, wherein detecting whether the first content should be horizontally displayed on the display further comprises detecting a lean of a head of the viewer.

15. The system of claim 9, wherein the hardware processor is further configured to:

detect that the orientation of the viewer has changed from a first orientation to a second orientation;

update the presentation of the second content, wherein the second content includes at least a portion of the first content rotated based on the second orientation of the viewer after a predetermined amount of time has elapsed.

16. The system of claim 9, wherein the hardware processor is further configured to:

detect that the orientation of the viewer has changed from a first orientation to a second orientation;

determine an updated angle of rotation of the first content to be displayed based on the second orientation of a viewer; and update the presentation of the second content, wherein the second content is rotated includes at least a portion of the first content rotated at a rotational rate between the angle of rotation and the updated angle of rotation.

17. A non-transitory computer-readable medium containing computer executable instructions that, when executed by a processor, cause the processor to perform a method for adjusting one or more images displayed to viewers, the method comprising:

determining an angle of rotation of first content to be displayed on a display based on an orientation of a viewer;

determining a rotational limit for the angle of rotation of the first content; and causing second content to be presented on the display, wherein the second content includes at least a portion of the first content rotated by the angle of rotation and subject to the rotational limit.

* * * * *